(12) United States Patent
Monz et al.

(10) Patent No.: US 6,657,734 B1
(45) Date of Patent: Dec. 2, 2003

(54) SETTING OUT DEVICE

(75) Inventors: Ludwin-Heinz Monz, Ulm (DE); Bernd Donath, Jena (DE); Wieland Feist, Jena (DE); Christian Graesser, Stadtroda (DE); Steffen Laabs, Jena (DE)

(73) Assignee: ZSP Geodaetische Systeme GbmH, Jena (DE)

( * ) Notice: Subject to any disclaimer, the term of this patent is extended or adjusted under 35 U.S.C. 154(b) by 90 days.

(21) Appl. No.: 09/857,589

(22) PCT Filed: Oct. 6, 2000

(86) PCT No.: PCT/EP00/09796
§ 371 (c)(1), (2), (4) Date: Aug. 31, 2001

(87) PCT Pub. No.: WO01/27560
PCT Pub. Date: Apr. 19, 2001

(30) Foreign Application Priority Data

Oct. 9, 1999 (DE) .......................................... 199 48 705

(51) Int. Cl.$^7$ .............................................. G01B 11/24
(52) U.S. Cl. ....................... 356/601; 356/615; 356/616; 33/293; 702/94
(58) Field of Search ................................. 356/601, 614, 356/615, 603, 616; 33/293; 702/94, 150

(56) References Cited

U.S. PATENT DOCUMENTS

| | | | | |
|---|---|---|---|---|
| 3,707,330 A | * | 12/1972 | Pine | 356/153 |
| 4,441,812 A | * | 4/1984 | Feist | 356/147 |
| 4,593,474 A | * | 6/1986 | Mayhew | 33/264 |
| 4,681,433 A | * | 7/1987 | Aeschlimann | 356/5.1 |
| 4,948,258 A | * | 8/1990 | Caimi | 356/603 |
| 5,313,409 A | * | 5/1994 | Wiklund et al. | 356/4.01 |
| 5,467,290 A | * | 11/1995 | Darland et al. | 342/463 |
| 5,512,905 A | * | 4/1996 | Nichols et al. | 342/357.06 |
| 5,671,160 A | * | 9/1997 | Julian | 702/94 |
| 5,739,785 A | | 4/1998 | Allison et al. | |
| 5,767,952 A | | 6/1998 | Ohtomo et al. | |
| 5,903,235 A | | 5/1999 | Nichols | |

FOREIGN PATENT DOCUMENTS

| | | |
|---|---|---|
| DE | 31 39 239 | 8/1982 |
| DE | 38 39 797 | 7/1989 |
| DE | 90 16 633 | 2/1991 |
| JP | 4-93714 | 3/1992 |

OTHER PUBLICATIONS

Derwent 1992–175523 Hesse, W, Gauging Instrument for land Surveying—Simultaneously determines position and height of points in hollow spaces of difficult acess using electro–optical computer–tacheometry.*

* cited by examiner

Primary Examiner—Frank G. Font
Assistant Examiner—Roy M. Punnoose

(57) ABSTRACT

A setting out device comprises a rod which can be supported at a target point in the area surrounding a point to be set out, a reflector which is arranged on the rod for tachymetric detection of the target point, a unit provided at the rod for transmitting information to and receiving information from a tachymeter, and an auxiliary setting out device which is arranged or can be arranged in a definite position in relation to the reflector for converting position correction information with respect to the point to be set out that was transmitted to the transmitting and receiving unit into a mark in the terrain representing the point to be set out. In this way, it is possible to set out possible projected points in the terrain within a short period of time and with great accuracy.

15 Claims, 4 Drawing Sheets

SETTING OUT DEVICE

CROSS-REFERENCE TO RELATED APPLICATIONS

This application claims priority of German application No. 199 48 705.7, filed Oct. 9, 1999 and International Application No. PCT/EP00/09796, filed Oct. 6, 2000, the complete disclosure of which is hereby incorporated by reference.

BACKGROUND OF THE INVENTION a) Field of the Invention

The invention is directed to a setting out device for tachymeters, comprising a rod which can be set vertically on a target point in the area surrounding a terrain point to be set out, a reflector which is arranged on the rod for tachymetric detection of the target point, and means for communication between the rod and tachymeter.

b) Discussion of the Relevant Art

The use of setting out devices of the type mentioned above for setting out and measuring terrain points together with tachymeters is known in the prior art. However, amid further development of electronic tachymeters, a fast and efficient setting out of terrain points in which projected points in a locality or a terrain are transmitted proceeding from a known position becomes increasingly important.

In order to set out a terrain point, the collimation axis or sighting axis of a tachymeter is brought into a vertical plane which is determined by the vertical direction in the tachymeter position and the direction to the terrain point to be set out. A reflector is oriented in this vertical plane and set up as close as possible to a terrain point to be set out in the area surrounding this terrain point. In the following description, the location where the reflector is set up is referred to as the target point.

The distance to the reflector position is then measured from the tachymeter position and position correction information relating to the target point is obtained from this measured distance with the aid of the known reference position of the terrain point to be set out. On the basis of the position correction information, the terrain point to be set out is manually measured and marked proceeding from the target point.

Particularly in case of great distances between the tachymeter and reflector, the orientation of the reflector and the conversion of position correction information are difficult to carry out because the position correction information is obtained at the tachymeter station, but conversion into the terrain takes place at the target point.

In order to facilitate the transfer of information, it was suggested in JP-A-4-93714 to arrange for wireless data transfer between the tachymeter and a setting out device which is to be set up at the target point and provided with a reflector. For this purpose, the setting out device is provided with a corresponding reception device and a display for showing the transmitted information. However, in the known setting out device, the terrain point to be set out must still be measured manually from the target point. This process is relatively time-consuming when carried out with sufficient accuracy.

Expenditure in time and apparatus for setting out a terrain point increases considerably with increasing demands for accuracy. In practice, a distinction is made between coarse setting out with which an accuracy of about 3 to 10 cm is achieved, medium-accuracy fine setting out with which tolerances of 5 to 10 mm can be achieved, and more accurate fine setting out which allows accuracies of 1 to 3 mm.

In order to transfer a projected point in a locality or a terrain, a coarse setting out is carried out initially, wherein the direction is first predetermined by the tachymeter proceeding from a fixed point. A person carrying the setting out device with the reflector is oriented visually by signaling. Orientation at a distance is carried out in stages by measuring and informing the operator of the setting out device of the distance to be covered. This process is repeated until the target point with the above-mentioned coarse setting out tolerance lies in the area surrounding the terrain point to be set out.

In order to accurately determine the terrain point to be set out, i.e., for fine setting out, the setting out device is held exactly on the target point determined in the coarse setting out. Deviations of the terrain point to be set out from the target point are determined by accurate sighting and measuring with the tachymeter. The values are then initially at the location where the tachymeter is set up. Corresponding position correction information for the terrain point to be set out is then transmitted to the set-up location of the setting out device and measured manually on the ground by the operator, whereupon the located terrain point to be set out is marked. A control measurement is then carried out, if necessary, with the setting out device held at the terrain point to be set out.

OBJECT AND SUMMARY OF THE INVENTION

Based on this prior art, it is the primary object of the invention to further develop a setting out device of the type described above in such a way that terrain points to be set out can be determined and marked within a short period of time and with great accuracy.

This object is met by a setting out device for tachymeters comprising a rod which can be set vertically on a target point in the area surrounding a terrain point to be set out, a reflector which is arranged on the rod for tachymetric detection of the target point, a transmitting and receiving device for exchanging information with the tachymeter, a computing circuit for determining deviations in position between the target point and terrain point, and an auxiliary setting out device for marking the position of the terrain point to be set out.

The setting out device according to the invention allows an efficient and accurate transmission of the projected points in a terrain because the accuracy of fine setting out can be realized by means of a procedure such as that previously customary for coarse setting out. By identifying in positionally accurate manner the terrain point to be set out, the time-consuming and error-prone manual transmission of position correction information is avoided. In this way, the time required for finding and setting out a projected point in the terrain is considerably reduced without forfeiting accuracy.

In an advantageous construction of the invention, the terrain point to be set out is marked in an optically perceptible manner, for example, by light. This has the advantage that the operator of the setting out device need only arrange a permanent mark at the temporarily identified point to conclude the setting out process.

The auxiliary setting out device preferably has a laser device with a diffractive-optic element for generating a light pattern in the form of a grid, a point field, or in the form of concentric circles. In this way, additional information, for example, concerning the ordering of the terrain point in a point grid, can be gained in addition to the information about the position of the terrain point to be set out.

In a further advantageous construction of the invention, the auxiliary setting out device comprises a laser pointer which is movable in at least two coordinate directions for generating a punctiform mark in the terrain. This embodiment form also allows greater distances between the target point and the terrain point to be set out beyond the conventional tolerances of coarse setting out, so that the orientation in the area surrounding the terrain point to be set out and its determination and marking off can be further accelerated without impairing the above-mentioned accuracy level of an accurate fine setting out.

In an alternative embodiment form, the auxiliary setting out device has a transmitting module arranged at the rod, preferably near the ground, for sending position values, preferably via modulated sound waves and/or electromagnetic waves, and a manually displaceable reception module for receiving the positioning values and for marking the terrain point to be set out. The reception module can be moved by hand like a three-dimensional mouse, wherein its position or reference point identifies the terrain point to be set out. Also, in this case, a terrain point to be set out is determined proceeding from a target point which is at a greater distance from the terrain point than the conventional accuracy range of coarse setting out, so that the entire setting out process can be carried out faster.

The receiver module preferably has an ultrasonic transmitter for locating the terrain point to be set out, for which purpose, a reference point is made to coincide at the receiver module with the imaging of the terrain point to be set out. Further, a device is provided for transferring the spatial position of the reference point of the receiver module to a permanent mark in the terrain. This enables an efficient one-handed operation for positioning and marking off, so that the other hand of an operator remains free for holding the setting out device or the rod with the reflector.

A particularly simple construction and handling of the reception module results when a color pointer is provided at the receiver module for arranging the mark in the terrain, by means of which a permanent color identification can be carried out at the point in the terrain to be set out.

In order to enable advantageous, space-saving transport and storage, the transmitting and receiving unit is coupled to the carrier in a detachable manner. Since this unit generally contains sensitive electronic components, it can be separated from the rod and transported and stored in a specially protected manner. Further, in the case of telescoping rods, this makes possible an arrangement which takes height requirements into account.

In another advantageous construction, a display is provided at the transmitting and receiving device for displaying information, so that not only is the terrain point to be set out marked in the terrain, but the corresponding position correction values can also be adequately detected by the operator at the setting out device. In addition, the display allows communication with the operator at the tachymeter. This is particularly advantageous when the distance between the tachymeter and the setting out device exceeds shouting or hailing distance.

Further, an operator's control for entering information is provided at the transmitting and receiving unit, so that terrain information to be correlated with a terrain point to be set out can be correlated already during the setting out process. The corresponding information can be transmitted, via the transmitting and receiving unit, to the tachymeter or another evaluating device, so that it is not necessary to correlate subsequently. Further, the operator's control can also be used for communicating with the operator at the tachymeter.

In another advantageous construction of the invention, the rod has a part on the ground side and a part which can telescope upward, the reflector being arranged at the telescoping part, and the telescoping part is guided in a defined position allocation relative to the ground-side part. In this way, the setting out device can also be used in hard-to-see terrain. In addition, an improved distance measurement accuracy can be achieved at greater measurement distances.

The transmitting and receiving unit is preferably arranged at the ground-side part, so that when the part with the reflector telescopes out, it can always remain easily accessible at the same height for the operator at the setting out device. In order not to impair the accuracy of measurement on one hand and to ensure fast handling of the setting out device on the other hand, means are provided for detecting the position correlation between the telescoping part and the groundside part, so that the change in position of the reflector relative to the target point is taken into account in the determination of position correction information.

To facilitate the coarse orientation, corresponding information is indicated on the display, so that orientation can be carried out quickly even when there is no direct visual contact with the tachymeter from the height of the operator.

For particularly simple orientation of the operator of the setting out device, direction orientation is carried out by means of a position signal which can be switched on and off.

In another advantageous construction, distance instructions can also be carried out via the display for the same reasons. A blinking light with variable blinking frequency is preferably used for this purpose. The blinking frequency is varied depending on whether the distance is too great or too small in relation to the terrain point to be set out. By further varying the blinking frequency, which also includes a constant light or a light that is switched on and off, it can also be indicated that a correct position or reference value is achieved.

BRIEF DESCRIPTION OF THE DRAWINGS

The invention will be described more fully in the following with reference to embodiment examples. In the accompanying drawings.

DESCRIPTION OF THE PREFERRED EMBODIMENTS

Figure 1A:
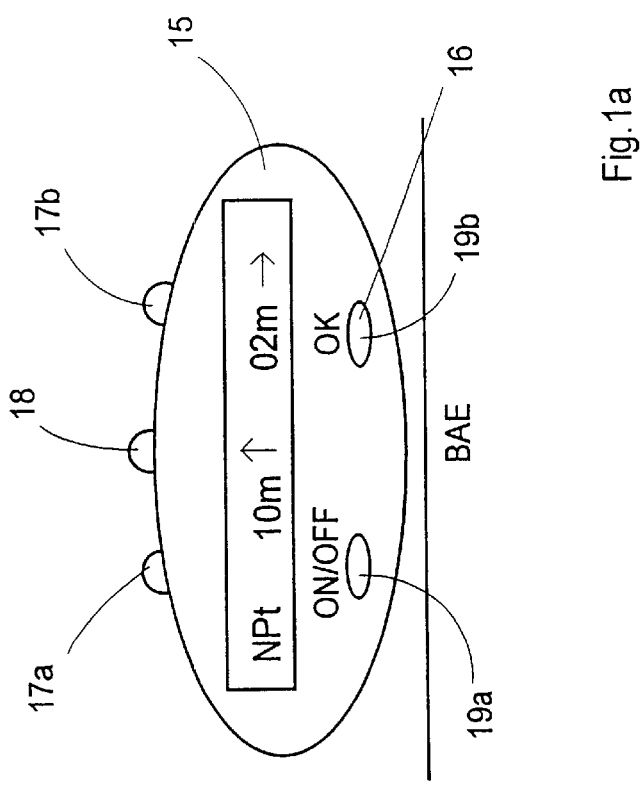
FIG. 1a shows a view of the display of a transmitting and receiving unit (4) which is arranged at the setting out device (1)
Figure 1:
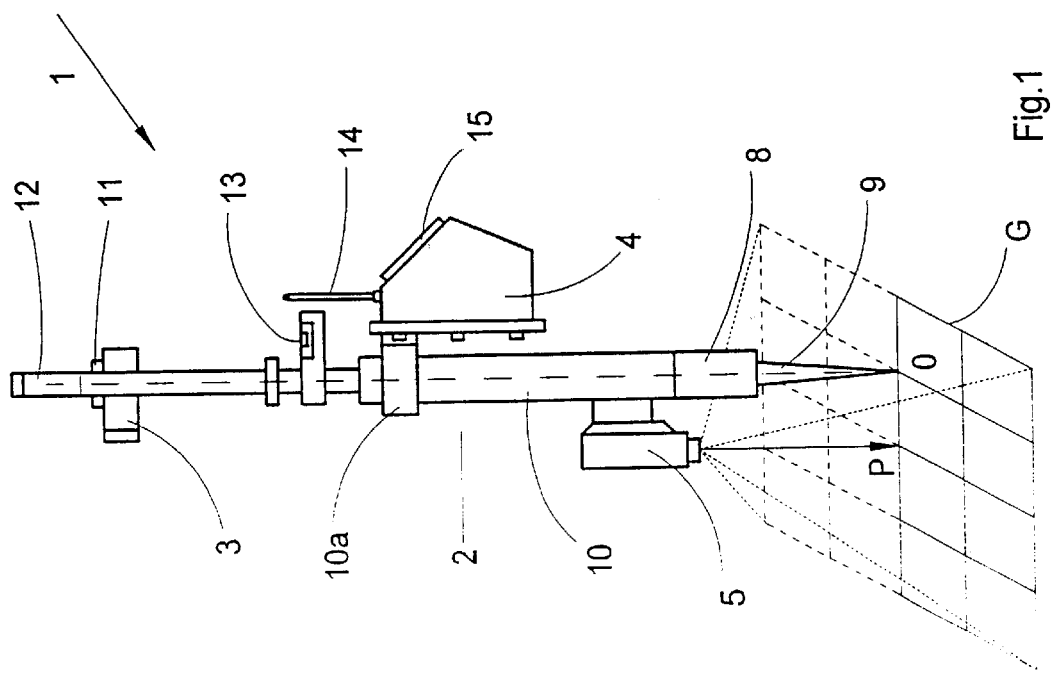
FIG. 1 shows a first embodiment example of a setting out device with an auxiliary setting out device for generating a grid-shaped mark.

FIG. 1 shows the first embodiment example of a setting out device 1 with a rod 2 which can be placed over a target point O in the area surrounding a projected terrain point P to be set out and which is used for sighting through a tachymeter.

In this first embodiment example, the rod 2 has a ground piece 8 with a tip 9 which can be supported on the terrain. A rod part 10 is coupled to the upper end of the ground piece 8 in a defined position and ensures that the distance of the rod part 10 over the supporting point remains constant.

A reflector 3 with a viewfinder 11 for sighting with the tachymeter is provided on the rod 2. The upper end of the rod 2 is terminated by a handle 12. Further a bubble level 13 is arranged on the rod 2 for vertical alignment of the setting out device 1.

Further, the setting out device 1 according to the first embodiment example has a transmitting and receiving unit 4 and an auxiliary setting out device 5 cooperating with the latter, both of which are arranged at the upper rod part 10, wherein the auxiliary setting out device is positioned in an exactly defined and known position to the reflector 3 on the rod 2.

The transmitting and receiving unit 4 is used for communicating with a controlling and evaluating device on the tachymeter side. In the shown embodiment example, a transmission path is used for two-sided data transfer, for which purpose an appropriate antenna 14 is provided at the transmitting and receiving unit 4. Further, a display 15 is arranged on the transmitting and receiving unit 4 to assist in handling the setting out reflector 1, so that instructions for orientation of the setting out device 1 in the surrounding area close to a terrain point P to be set out can be displayed at the latter.

This is advantageous particularly for greater distances from the tachymeter which exceed hailing distance. Moreover, this eliminates the need for separate radio devices for orientation. Rather, an acoustic function of this kind can be additionally integrated in the transmitting and receiving unit 4, wherein a voice connection can then preferably be established in both directions.

Further, input devices 16 are provided at the transmitting and receiving unit 4, as is shown for example in FIG. 1a, which allow additional information about a terrain point to be set out to be entered directly via the setting out device 1, wherein the corresponding data are then transmitted by means of the transmitting and receiving unit 4 to the tachymeter or to an evaluating device associated with the latter. Further, information about the status of the setting out device, e.g., its readiness, and information about the work status, e.g., the fact that a set up has been concluded or that fine sighting is to be carried out, can be conveyed to the location where the tachymeter is set up.

Further, data concerning the setting out values, e.g., position values and height values, and additional information for characterizing the measurement point or the configuration of measurement points with respect to one another, e.g., in order to convey determined relationships of points with one another, are exchanged between the tachymeter and the setting out device 1. Further, direction information can be transmitted to provide an operator at the setting out device with instructions about the direction in which a measurement value is to be set.

For immediate transmittal of a projected point in the terrain proceeding from a target point O, the setting out device 1 has an auxiliary setting out device 5 which, in the first embodiment example, comprises a laser device with a diffractive-optic element for generating a light pattern in the form of a line grid G.

The projected terrain point P to be set out is projected in the terrain through this grid G and can then be immediately permanently marked without further steps. The projection of the line grid G in the terrain is carried out depending on the setup location, i.e., the target point O of the setting out device 1. This location can be exactly determined by sighting proceeding from the tachymeter side. Based on the reference values of the projected terrain point P to be set out, position correction information is determined on the tachymeter side and is then transmitted to the transmitting and receiving unit 4 of the setting out device 1. The position correction values are indicated on the display 15 of the transmitting and operating unit 4. Further, the correction values are sent to the auxiliary setting out device 5 where they are converted into suitable presets for the laser device so that the terrain point P to be set out can be imaged in the terrain in the correct location in relation to the target point O by means of the line grid G.

Alternatively, the actuating variables can also be determined already in the transmitting and receiving unit 4 insofar as the latter is outfitted with the corresponding computing circuit.

In addition, a plausibility control can be carried out with respect to the position of the terrain point P to be set out by simultaneously sending the position correction information to the display 15 and projecting a corresponding optically perceptible light pattern in the terrain.

In the following, the process for setting out a terrain point in the terrain using the setting out device 1 shown in FIG. 1 will be described briefly. For this purpose, a coarse setting out is initially carried out in order to try to move the setting out device 1 as close as possible to the actual terrain point to be set out as quickly as possible. Orientation can be carried out, in principle, in the conventional manner described above in the introduction.

However, the display 15 provided at the transmitting and receiving unit, which is shown in section in FIG. 1a, is preferably used particularly for great distances. In this connection, the direction in which the setting out device 1 is to be moved is given via position lights 17a and 17b, whose lights indicate the direction in which the position of the setting out device 1 is to be corrected.

Distance orientation is carried out by means of another light display 18, whose blinking frequency changes depending on the distance from the terrain point to be set out. In the embodiment form shown in FIG. 1, slower blinking is used to direct the setting out device 1 farther away, while faster blinking means that it should be brought closer. A continuous light or, alternately, the switching off of the light 18, indicates that the terrain point to be set out, or a tolerance field surrounding the latter at a distance on the order of about 10 cm, has been reached.

As will also be seen from FIG. 1, control elements 19a and 19b are provided in the surrounding field of the display 15 by which the transmitting and receiving unit 4 can be switched on and off and the conclusion of a setting out procedure can be entered in order to transmit this information to the location where the tachymeter is set up.

When a target point O has been found in the surrounding area of the terrain point P to be set out, the setting out device 1 is set up exactly at the target point O. Exact sighting and measuring is then carried out proceeding from the tachymeter. The position correction information is determined in the tachymeter in the form of orthogonal or polar data. These data, along with additional direction information, are then transmitted to the setting out device 1 by radio, wherein radio ranges from 100 MHz to 5 GHz can be used. This information is displayed on the display 15. In conventional setting out devices, the obtained position correction information had to be measured proceeding from the target point O and transmitted manually to the terrain in order to reach the terrain point P to be set out.

However, as was already explained, in the setting out device 1 according to the first embodiment example, the position correction information is converted, according to the invention, into a grid G projected in the terrain so that a manual measuring process can be dispensed with. Rather, the terrain point P to be set out in the terrain can be directly determined based on the grid G, generally based on the grid center, and can immediately be marked.

If necessary, a control measurement can then be carried out in which the setting out device 1 is set up in the terrain point P which is found and set out, wherein the conclusion of the control measurement is signaled via the display 15. When setting out is concluded, the distances to be covered for another projected terrain point to be set out are immediately indicated on the display 15.

In order to facilitate transport and storage, the setting out device 1 can be disassembled, wherein the transmitting and receiving unit 4 containing sensitive components can be removed from the rod 2. Insofar as wireless information transfer is set up between this transmitting and receiving unit 4 and the setting out device 5, for example, by radio or infrared or ultrasound, the setting out device 1 can also be operated with decoupled transmitting and operating unit 4.

Figure 2:
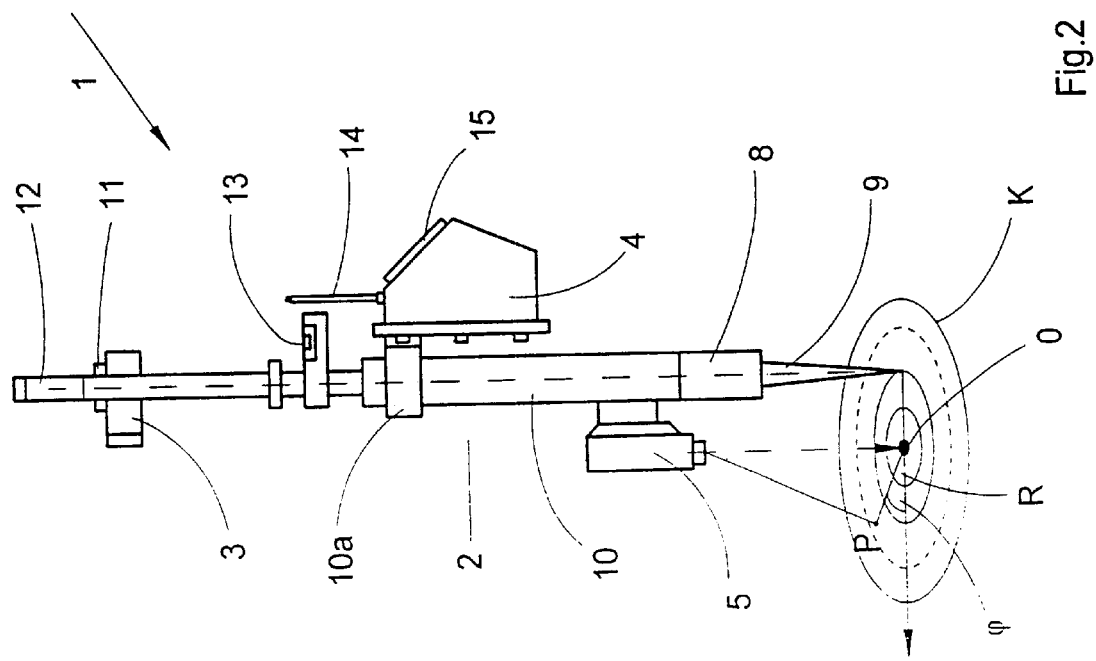
FIG. 2 shows a second embodiment example with an auxiliary setting out device for generating a mark in the form of concentric circles around a terrain point to be set out.

The second embodiment example in FIG. 2 differs from the first embodiment example only through the use of a projection pattern in the form of concentric circles K which are arranged around the terrain point P to be set out, which projection pattern is particularly suited to measurement based on polar coordinates.

Figure 3:
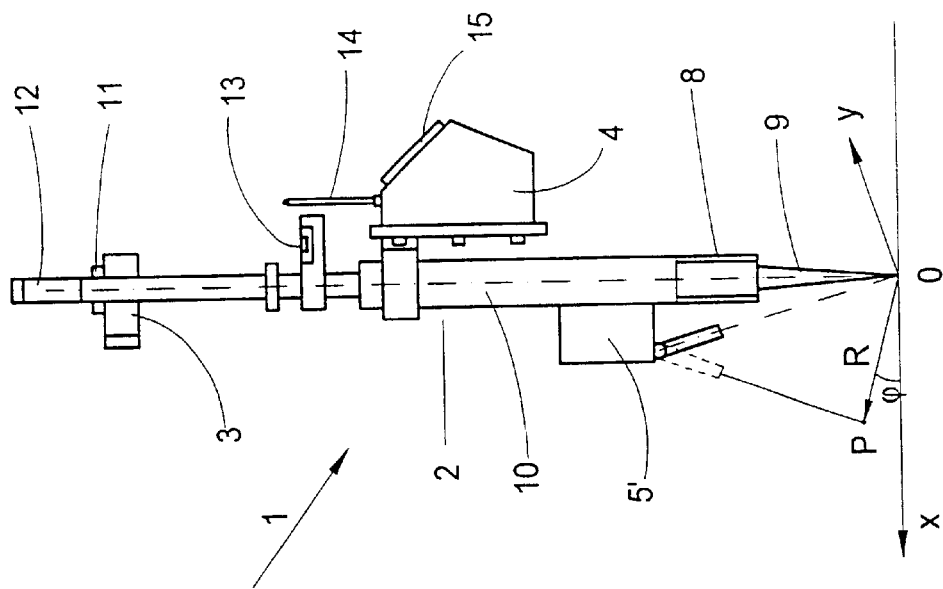
FIG. 3 shows a third embodiment example with an auxiliary setting out device in the form of a laser pointer which can be moved in two coordinate direction.

A third embodiment example is shown in FIG. 3 in which, in contrast to the above-mentioned embodiment examples, a laser pointer which is controlled in two coordinates X, Y serves as an auxiliary setting out device 5' which is arranged in a defined known position relative to the reflector 3 as in the preceding two embodiment examples. The terrain point P to be set out in the terrain is marked by means of a punctiform light spot.

Figure 4:
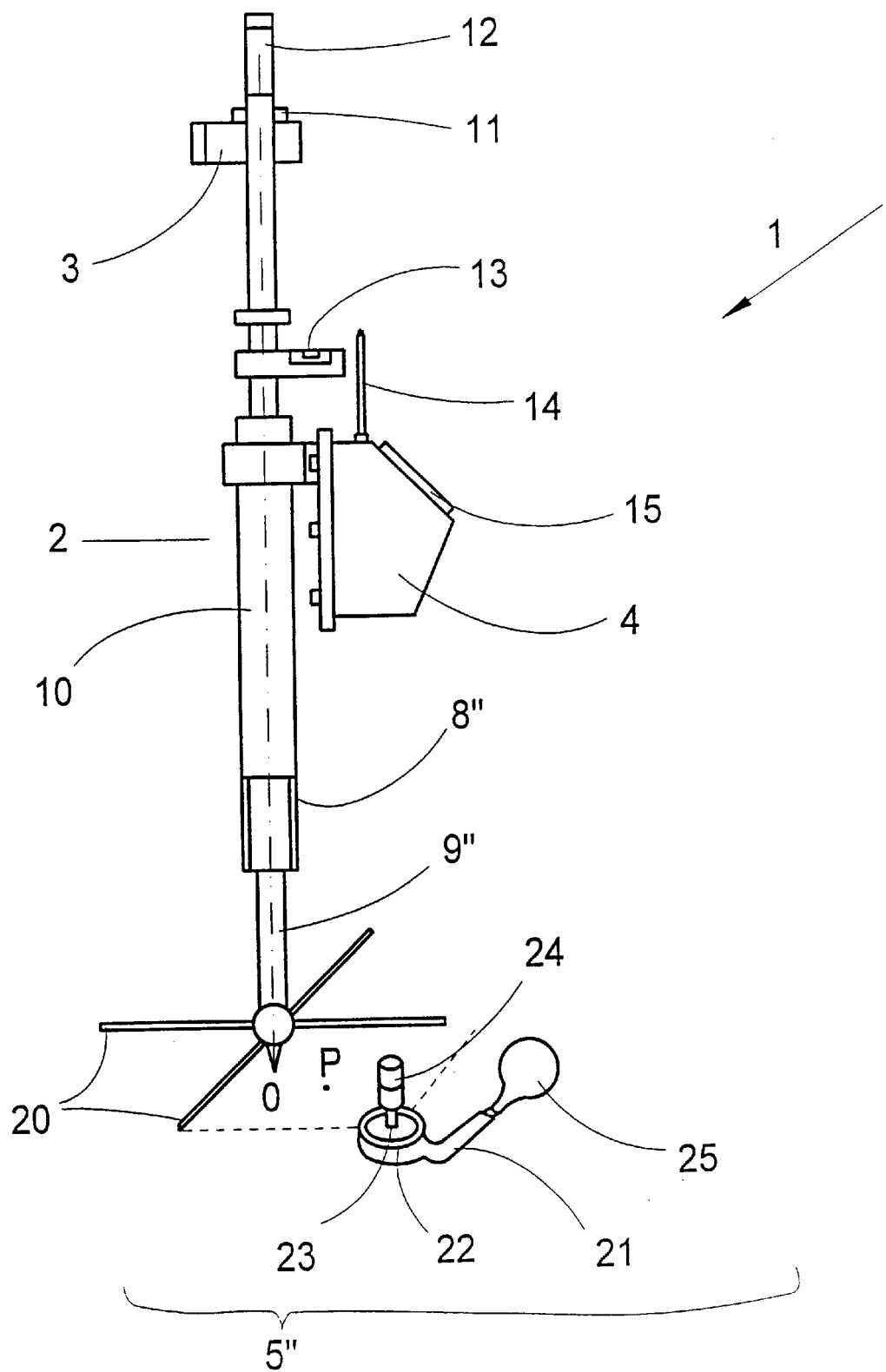
FIG. 4 shows a fourth embodiment example with a manually displaceable device for setting out the terrain point, which manually displaceable device is separate from the setting out device.

Another embodiment example is shown in FIG. 4. This embodiment example corresponds to the preceding embodiment examples with respect to the rod 2, the reflector 3 and the transmitting and receiving unit 4, so that only their differences will be discussed briefly in the following. In FIG. 4, the auxiliary setting out device 5" is arranged only partially on the rod 2. This rod 2 has a ground piece 8" which can be coupled to the rod part 10 in a defined position allocation. The ground piece 8" is provided with a transmitting module 20 in the area of its tip 9", this transmitting module 20 cooperating with a reception module 21 that is separate from the rod 2 in order to make it possible to locate the terrain point P to be set out in relation to the target point O via electromagnetic waves or ultrasound, wherein the latter is applied in this embodiment example.

The transmitting module 20 comprises four uniformly spaced coordinate arms with a length of about 200 mm which extend from the tip 9" and are articulated at a central sphere and can be folded up against the carrier 2 when necessary.

The reception module 21 is constructed as a three-dimensional mouse which can be moved by hand and which carries a corresponding sensor 22, by means of which a mark of the terrain point P to be located can be found. An identifying mark representing the terrain point P to be set out is then carried out in the terrain by means of a reference point 23 provided at the reception module 21. In order to enable permanent marking at the same time, a color paint reservoir 24 and actuating device 25 are provided at the reception module 21 for generating a colored point in the terrain; together they form a color spray or color pointer.

Figure 5:
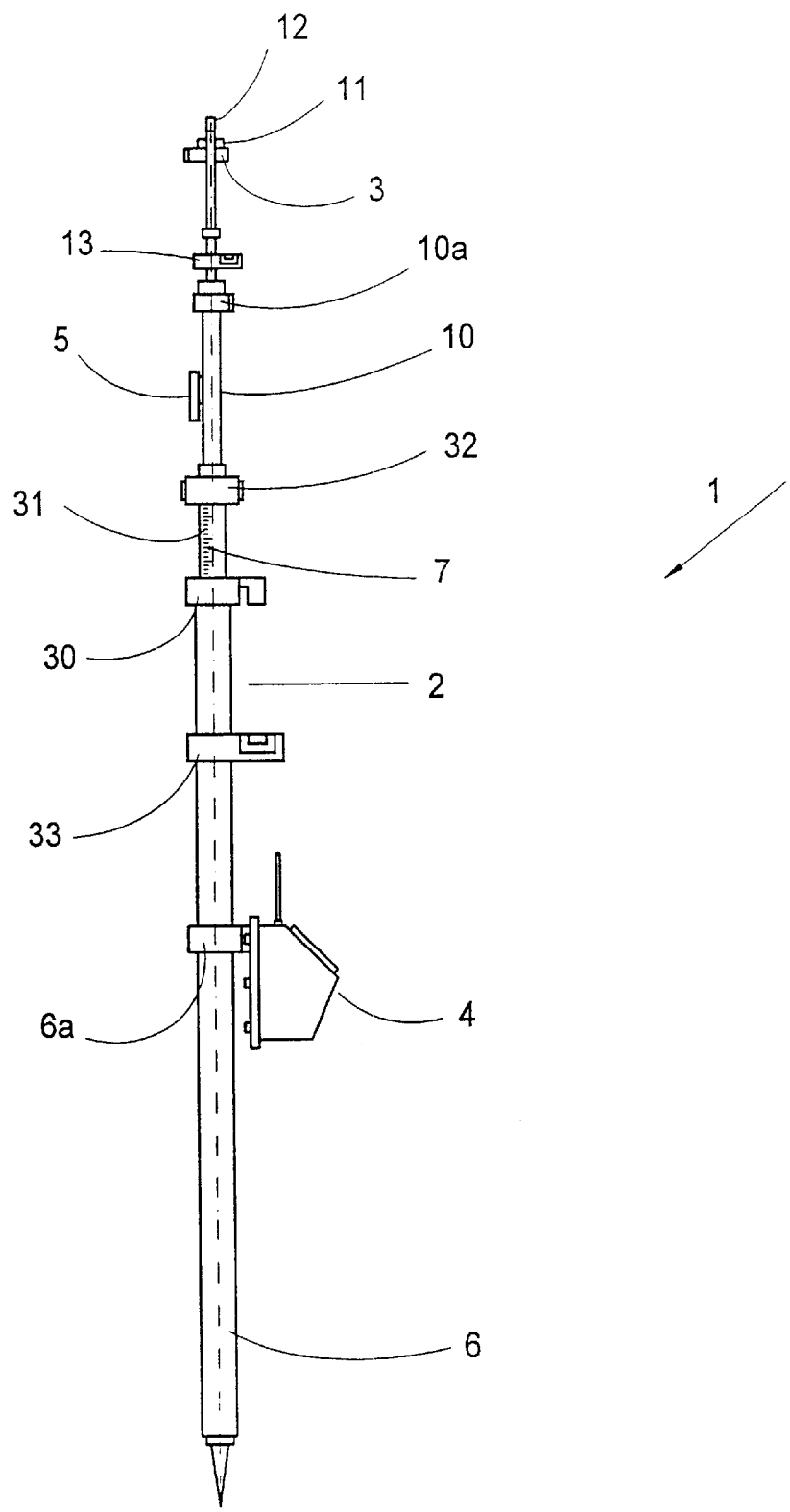
FIG. 5 shows a fifth embodiment example with a setting out device comprising a telescoping part.

A fifth embodiment example is shown in FIG. 5. In this embodiment example, the rod 2 is constructed telescopically. A part 7 which can telescope upward and which carries the reflector 3 is inserted into the ground-side part 6. The telescoping part 7 can be locked with respect to the ground-side part 6. For this purpose, a suitable clamping device 30 is arranged at the top end of the ground-side part 6. In order to determine the extension length which is required for determining the height of the reflector 3 above a setting out point, a scale 31 is arranged at the telescoping part 7. A catch 32 prevents the telescoping part 7 from moving too far into the ground-side part 6.

A reflector arrangement which is constructed in accordance with the rod part 10 of the first embodiment example is provided at the upper end of the telescoping part 7. In a special variant, the rod part 10 of the first embodiment example can be coupled to the upper end of the telescoping part 7 with defined position correlation. Accordingly, a reflector 3 with a viewfinder 11 and a handle 12 are provided at the rod part 10. Further, a bubble level 13, a connection device 10a for a transmitting and receiving unit 4, and an auxiliary setting out device 5" are provided in FIG. 5.

In the embodiment example shown in FIG. 5, however, the transmitting and receiving unit 4 is located at the ground-side part 6 which has a suitable holding device 6a for this purpose. As in the embodiment examples mentioned above, the transmitting and receiving unit 4 is also detachably coupled.

The arrangement at the ground-side part 6 allows the transmitting and receiving unit 4 to be independent from height, so that it can be read easily even when the reflector 3 extends far up at the telescoping part 7.

For the same reason, another bubble level 33 is arranged at the ground-side part 6 just above the transmitting and receiving unit 4, so that a vertical orientation of the setting out device 1 shown in FIG. 5 can also be monitored easily in a fully extended state. In order to determine the height of the reflector above the ground, means for detecting the position allocation between the telescoping part 7 and the ground-side part 6 are provided in the setting out device 1. The corresponding information can be conveyed to the tachymeter via the transmitting and reception unit 4. In order to ensure the optical connection when transmitting information to the tachymeter via LEDs, the telescoping part 7 is guided at the ground-side part in such a way that the reflector 3 is always aligned with the transmitting and receiving unit 4.

While the foregoing description and drawings represent the present invention, it will be obvious to those skilled in the art that various changes may be made therein without departing from the true spirit and scope of the present invention.

What is claimed is:

1. A setting out device for use with at least one tachymeter comprising:
   a rod which can be set vertically on a target point in the area surrounding a terrain point to be set out;
   a reflector which is arranged on the rod for tachymetric detection of the target point by the tachymeter;

a transmitting and receiving device for exchanging information with the tachymeter;

a computing circuit for determining deviations in position between the target point and terrain point; and an auxiliary setting out device for marking the position of the terrain point to be set out.

2. The setting out device according to claim 1, wherein optical means are provided for marking the position of the terrain point to be set out.

3. The setting out device according to claim 2, wherein the auxiliary setting out device comprises a laser device which is provided with a diffractive-optic element for generating a light pattern directed to the area surrounding the target point in the form of a grid, a point raster and/or concentric circles.

4. The setting out device according to claim 1, wherein the auxiliary setting out device comprises a laser device for generating a punctiform mark which is directed to the surrounding area of the target point and which can be deflected in two coordinate directions over the surrounding area.

5. The setting out device according to claim 1, wherein the auxiliary setting out device has a transmitting module arranged at the rod, near the ground, for sending position values, via modulated sound waves and/or electromagnetic waves, and a manually displaceable reception module for receiving the position values and for marking the terrain point to be set out.

6. The setting out device according to claim 5, wherein the transmission of the position values is provided by ultrasound, the reception module has a reference point which can be made to coincide with the terrain point to be set out, and a device is provided for permanently marking the position of the terrain point after coinciding with the reference point.

7. The setting out device according to claim 6, wherein the reception module has a color pointer for marking the terrain point to be set out in the terrain in color.

8. The setting out device according to claim 1, wherein the transmitting and receiving unit is coupled to the rod in a detachable manner.

9. The setting out device according to claim 1, wherein the transmitting and receiving device has a display for displaying information.

10. The setting out device according to claim 1, wherein the transmitting and receiving unit has an operator's control for entering information.

11. The setting out device according to claim 1, wherein the rod has a ground-side part and a part which can telescope vertically upward, the reflector being arranged at the telescoping part, and the telescoping part is guided in a defined position allocation relative to the ground-side part.

12. The setting out device according to claim 11, wherein the transmitting and receiving unit can be fastened to the telescoping part, and means are provided for detecting the position correlation between the telescoping part and the ground-side part.

13. The setting out device according to claim 9, wherein the display is constructed for displaying information about the coarse orientation of the rod in the area surrounding the terrain point to be set out.

14. The setting out device according to claim 13, wherein direction orientation is carried out by a position signal which is displayed on the display and which can be turned on and off.

15. The setting out device according to claim 13, wherein distance orientation is arranged at the display by a blinking light with variable blinking frequency, wherein different blinking frequencies signal too great a distance, a correct distance, and too little distance.

* * * * *